Figure 1:
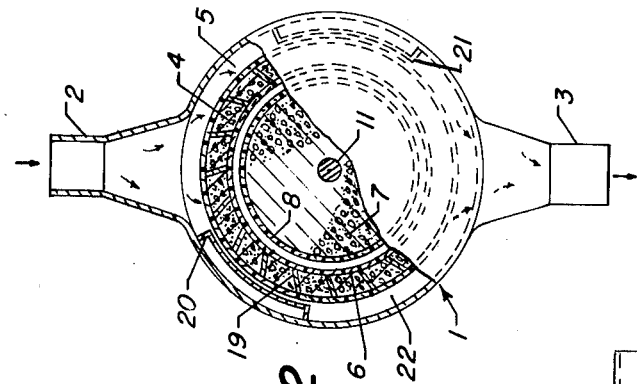

United States Patent [19]

Urban

[11] 4,047,895
[45] Sept. 13, 1977

[54] APPARATUS FOR THE PURIFICATION OF ENGINE EXHAUST GASES WITHOUT OXIDATION OF ENTRAINED $SO_2$

[75] Inventor: Peter Urban, Northbrook, Ill.
[73] Assignee: UOP Inc., Des Plaines, Ill.
[21] Appl. No.: 627,161
[22] Filed: Oct. 30, 1975
[51] Int. Cl.[2] .................... B01J 8/04; F01N 3/15; F01N 3/16; F01N 5/04
[52] U.S. Cl. .................... 23/288 F; 55/DIG. 30; 60/297; 60/299
[58] Field of Search ........ 23/288 F, 288 FB, 288 FC; 55/DIG. 30; 60/295–297, 299; 423/212 C, 213.7, 244

[56] References Cited

U.S. PATENT DOCUMENTS

| | | | |
|---|---|---|---|
| 2,792,909 | 5/1957 | Court | 23/288 F |
| 3,050,375 | 8/1962 | Bloch | 23/288 F |
| 3,061,416 | 10/1962 | Kazokas | 23/288 FB |
| 3,074,391 | 1/1963 | Bloch | 55/DIG. 30 |
| 3,159,450 | 12/1964 | Asker et al. | 23/288 F |
| 3,404,965 | 10/1968 | Shiller | 23/288 FB |
| 3,429,656 | 2/1969 | Taylor et al. | 23/288 FB |
| 3,443,886 | 5/1969 | Taylor et al. | 423/213.7 |
| 3,485,593 | 12/1969 | Lenane et al. | 55/DIG. 30 |
| 3,607,133 | 9/1971 | Hirao | 23/288 F |
| 3,908,367 | 9/1975 | Bauman | 23/288 FB |

Primary Examiner—Morris O. Wolk
Assistant Examiner—Bradley Garris
Attorney, Agent, or Firm—James R. Hoatson, Jr.; Philip T. Liggett; William H. Page, II

[57] ABSTRACT

A catalytic converter system for engine exhaust gases provides an auxiliary moving bed of $SO_2$ adsorption material such that the $SO_2$ content of the exhaust stream can be continuously adsorbed into a segmental portion of the bed prior to reaching the catalytic conversion zone. At the same time, the higher temperature treated gases from the catalyst zone are continuously passed through another portion of the $SO_2$ adsorption material to effect the removal of sorbed $SO_2$ therefrom, and the energy of the exhaust gas stream flow is utilized to contact vanes or turbine type blades to provide the continuous rotational movement of the bed of $SO_2$ adsorbing material so that it, in turn, is rotated or cycled through the adsorption zone and through the desorption zone and then back to the adsorption zone in a continuous operation as long as there is exhaust gas flow in the system.

4 Claims, 5 Drawing Figures

APPARATUS FOR THE PURIFICATION OF ENGINE EXHAUST GASES WITHOUT OXIDATION OF ENTRAINED SO₂

The present invention relates to an improved method and means for effecting the catalytic conversion of engine exhaust gases in a manner to preclude the conversion of entrained sulfur dioxide ($SO_2$) to sulfur trioxide ($SO_3$) and thence to sulfuric acid.

In a more specific aspect, the present invention provides a conversion system where a movable bed of $SO_2$ adsoprtion material, such as alumina, activated carbon, zeolitic molecular sieves, etc., is combined with a fixed position catalyst zone to effect the continuous removal of the $SO_2$ content of the exhaust gas stream piror to its having contact with the catalyst surface and, at the same time, the sorptive material is caused to be rotated, or otherwise moved, by the velocity movement of the stream in the system such that treated gas stream leaving the catalyst zone can desorb the $SO_2$ from the moving bed of material. The adsorption and desorption operations thus provide a continuous by-passing arrangement which continues to keep the $SO_2$ out of the catalyst section.

BACKGROUND OF THE INVENTION

It is now well known that for some period of time the use of catalytic converters had been proposed for converting the undesirable compounds in automobile and truck engine exhaust gases to provide less objectionable products of combustion and that the converters are now in usage on the majority of new cars presently being produced and sold. The catalytic conversion being effected is primarily one of completing the oxidation of the products of combustion leaving the engine cylinders, i.e., carbon monoxide and unburned hydrocarbons are being further oxidized to harmless carbon dioxide and water vapor. However, in view of the fact that there are some sulfur compounds still present in gasoline for autos, as well as in diesel fuels for both autos and trucks, there has been the conversion of sulfur compounds in the fuel within the engine to form $SO_2$ and then the catalytic conversion of the $SO_2$ in the converter to $SO_3$ and to sulfuric acid ($H_2SO_4$). This resultant production of sulfuric acid from the cars with the catalytic converters has now caused considerable concern to the car using public to government officials, to the automobile manufacturers and to the oil refining industry. There is apparently no simple solution to the problem, particularly, where the removal of all of the sulfur from gasoline appears to be a prohibitive procedure by necessitating vast, expensive additions to most all present gaasoline refining facilities. There would also be an additional cost to the resulting gasoline as well as some loss in yield.

In lieu of eliminating or reducing the amount of sulfur present in the grades of gasoline now in use, it is an object of the present invention to provide a catalytic converter system and method of operation where the $SO_2$ in the engine exhaust stream will be, in effect, by-passed around the catalyst section of the converter and it can be discharged without being converted to $SO_3$ or $H_2SO_4$.

A further object of the invention is to provide a $SO_2$ adsorbing material in a gas previous bed to essentially remove the $SO_2$ content of the exhaust stream so that it can be catalytically converted without forming $SO_3$ or $H_2SO_4$ and, in addition, to provide for a rotatable, or otherwise movable, bed of the sorptive material so that the portion(s) thereof picking up $SO_2$ can be rotated to a desorption zone where the catalytically treated gas stream can effect the removal of the $SO_2$ from the material and permit its reuse in the system.

As a still further object of the invention, there is the utilization of the exhaust gas stream flow to impinge upon suitably placed vanes or turbine type blades and effect the desired and required movement of the sorptive bed such that no extraneous motive power will be required to operate the novel converter system.

In one embodiment, the present invention is directed to a method for effecting the continuous cataytic conversion of an engine exhaust gas stream and for preventing sulfuric acid formation in the treated gas stream by providing for the continuous by-passing of the $SO_2$ content of the untreated stream around the catalyst conversion zone, which method comprises the steps of: (a) initially passing the engine exhaust through a $SO_2$ adsorption zone and into contact with a segmental portion of a gas previous moving bed of $SO_2$ adsorptive material; (b) passng a resulting substantially $SO_2$-free stream from the latter to an adjacent fixed position catalyst zone and into contact with the surface of a conversion catalyst retained therein; (c) passing the resulting catalytic treated gaseous stream at an increased temperature level from the catalyst zone to a desorption zone and therein effecting the contact of a segmental portion of said moving bed of $SO_2$ adsorptive material to effect $SO_2$ removal therefrom and the discharge of the combined gaseous stream from the conversion zone; and (d) using the energy of the gas stream flow through at least one of the contacting zones to effect the movement of the $SO_2$ adsorptive material so that all of the sections thereof will sequentially rotate through the adsorption and desorption zones.

In another embodiment, the invention provides a catalytic converter for engine exhaust gases which provides for by-passing sulfur dioxide around the catalyst section to preclude sulfuric acid in the treated exhaust stream and which comprises in combination, (a) a confined housing with exhaust gas inlet means thereto and a treated gas outlet therefrom; (b) a gas permeable catalyst retaining section with oxidation catalyst therein fixedly positioned within said housing; (c) an additional gas permeable section that retains a $SO_2$ adsorbent material therein that is rotatably supported within said housing to be maintained adjacent said catalyst section in a manner to permit gas flow between said sections and to provide for the movement of said adsorbent material between an upstream adsorption zone and a downstream desorption zone; (d) gas flow diverter means positioned in said converter to direct the incoming stream through a portion of the $SO_2$ adsorption section and through a portion of said $SO_2$ adsorbent material therein so as to pass a substantially $SO_1$-free stream to said catalyst section and, additionally, to direct a treated stream from the latter section through said downstream desorption zone to remove $SO_2$ from the adosrobent material and from the converter, and (e) vane means connective with said rotatable section which are positioned within the exhaust gas stream flow path through the housing whereby the adsorbent material in said rotatable section will be continuously moved therewith between the $SO_2$ adsorption and desorption zones in the housing.

In the $SO_2$ adsorption zone, it is of advantage to utilize subdivided particles which can provide a gas pervious bed of the sorptive material and permit the exhaust gas stream to readily pass therethrough and carry on into the catalyst zone for the subsequent catalytic oxidation of the undesired components in the stream. The sulfur components of the gasoline, or other engine fuel, will primarily be converted to sulfur dioxide in the engine; however, some $SO_3$ or other sulfur compounds may be present and the terminology "$SO_2$ adsorptive material", as utilized herein, should not be considered limiting since it is preferable that the material will have the capability of adsorbing $SO_2$ and other sulfur compounds that may be present. For example, the material may comprise alumina, activatd carbon, zeolitic molecular sieve material, etc., which types of material are capable of withstanding relatively high temperature conditions and can adsorb a major proportion of the sulfur compounds present in the exhaust gas stream. The temperature of the exhaust gas stream reaching the converter system can vary depending upon the type of automobile engine involved and the proximity of the converter to the engine itself. Thus, the temperature of the stream may vary from 500° to 1000° F. as it reaches the adsorption material and the inlet face of the catalyst section. On the other hand, the exhaust gas stream, after contact with the catalyst bed, will generally be to an elevated temperature which may be of the order of 200° to 500° F. higher than the inlet temperature to the catalyst zone. As a result, the elevated temperature stream can be quite effective in desorbing the $SO_2$ from the sorptive material in accordance with the operational procedure of the invention. Also, in accordance with the present invention, the sorptive bed will be continuously rotated, or otherwise moved, such that each portion of the bed will move from a sorption zone to a desorption zone and back to the former, whereby a portion of the bed is continuously serving to effect the adsorption of $SO_2$ from the gas stream while at the same time a previously contacted portion of the bed is undergoing contact with the treated exhaust gas stream so as to be desorbed and ready for use when it again reaches the sorption zone.

It is also within the scope of the present invention to make use of the velocity of the exhaust gas stream to effect the movement of the bed of sorptive material such that it will be contiuously rotated and moved between a sorption area and a desorption area. For example, the use of a plurality of radially and angularly positioned blades or vanes in combination with the movable bed of sorptive material and a channeling of the path of the exhaust gas stream flow in a manner to exert resultng force vectors and a rotational effect on the material retaining section, can provide for the desired movement of the sorptive material from one zone to another. It is also within the scope of the invention to utilize a suitable impeller wheel, or a small turbine type wheel, which is placed in the path of the exhaust gas stream and which will drive suitable gearing in turn connective with a shaft that is connected to the center of the retainer for the sorptive material so as to effect the desired rotation of the bed of $SO_2$ adsorptive material in the system.

Actually, it is not intended to limit the present invention to any one apparatus arrangement for positioning the catalyst in the converter, nor for effecting the placement of a $SO_2$ adsorptive material in combination therewith, as long as a portion of the sorptive material can provide an initial contact with the incoming exhaust gas stream to remove the $SO_2$ therefrom and then move to a downstream position with respect to the catalyst such that, at the same time, another portion of the adsorptive material will be extending across the path of the treated gas stream leaving the catalyst to provide for desorption of $SO_2$ from the bed. In one embodiment, there may be a cylindrical or annular-form $SO_2$ adsorptive bed which can be rotated around a central cylindrical core of catalytic material such that the incoming exhaust gas stream will first pass through a segmental portion of the $SO_2$ adsorptive bed prior to contacting the catalyst zone. The incoming gas stream will also contact suitable positioned vanes or turbine type blades associated with the retaining section for the adsorptive bed so that it will be subjected to rotation as long as there is exhaust gas flow.

In another type of apparatus arrangement, the $SO_2$ sorptive material can be retained within a generally flat disc-like retaining section which is superposed above or along side of a circular-form catalyst section such that the incoming gas stream will pass through a segmental portion of the $SO_2$ adsorptive material and pass on through an opposing portion of the catalyst section. At the same time, in a generally diametrically opposing portion of the converter, the exhaust gas stream leaving the catalyst section can pass through an opposing segmental portion of the $SO_2$ sorptive material so as to effect a desorption of $SO_2$ from the bed. Again, there may be radial vanes or impingement blade means provided in combination with the retaining section for the $SO_2$ sorptive material such that the incoming exhaust gas stream can effect a continuous rotational movement for such section, an thereby continuously rotate the sorptive material in a manner to have all the portions move between the adsorption area to the desorption area and then back to the adsorption area.

The catalyst section of the converter unit will also be of a type that is gas pervious such that there may be the continuous passage of an exhaust gas stream through the catalyst section to effect contact with the surface of the catalyst material and provide for the catalytic oxidation of the undesired components of the gas stream. It is, of course, not intended to limit the present invention to the use of any one type of catalyst in the converter and typically the catalyst will comprise a coating on a suitable refractory support material which may be in small spherical or pellet form of the order of 1/16 inch to about ¼ inch or, alteratively, the support may comprise a rigid skeletal honeycomb type of material having a multiplicity of small tubular form passageways therethrough so as to provide a relatively high surface area per unit of volume. Where subdivided particles are used in the catalyst section, the support can be a suitable refractory inorganic oxide such as alumina, silica, silica-alumina, alumina-magnesia, etc., although other inorganic oxide materials may be present as additives such as boria, thoria, calcium oxide, etc. The catalytic coatings may include metals of Groups IIA, IB, VB, VIB, VIIB and VIII, and in particular, copper vanadium, chromium, iron, cobalt, nickel, platinum, palladium, etc., with the components being used singly or in combination with one or more of another active component.

The rigid skeletal "honeycomb" materials may comprise alpha-alumina, alumina-silica-magnesia, zirconia-silica, zircon-mullite, sillimanite, petalite, spodumene, cordierite, alumina-silica, etc. The coatings on the honeycomb type materials may, of course, be similar to the active types of coatings hereto described in connection with the spherical or pelletized types of support materials.

Reference to the accompanying drawing and the following description thereof will serve to more clearly set forth the advantages and various arrangements which may be utilized for the improved catalytic converter system.

FIG. 1 of the drawing is a partial sectional elevational view of a converter system utilizing a rotatable $SO_2$ adsorbing section which is in the form of a hollow cylinder or annulus which circumscribes a central catalyst section.

Figure 2:
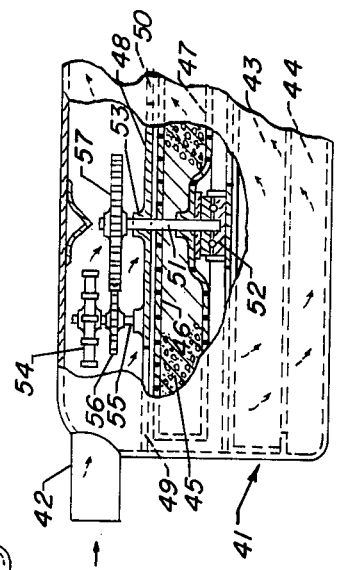

FIG. 2 of the drawing is a cross-sectional view of the converter unit of FIG. 1.

Figure 3:
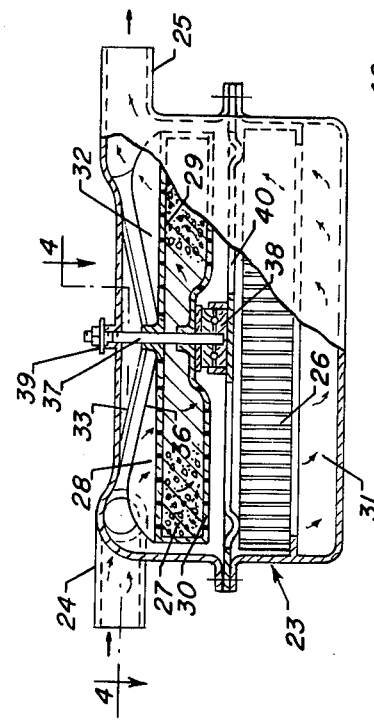

FIG. 3 of the drawing is a sectional elevational view of another form of converter unit having a $SO_2$ adsorbent bed maintained within a rotatable disc-like section and a catalyst section utilizing a honeycomb type of coated element supported in a manner to have exhaust gas flow in one direction for a portion of the element and in an opposing direction for another portion of the element.

Figure 4:
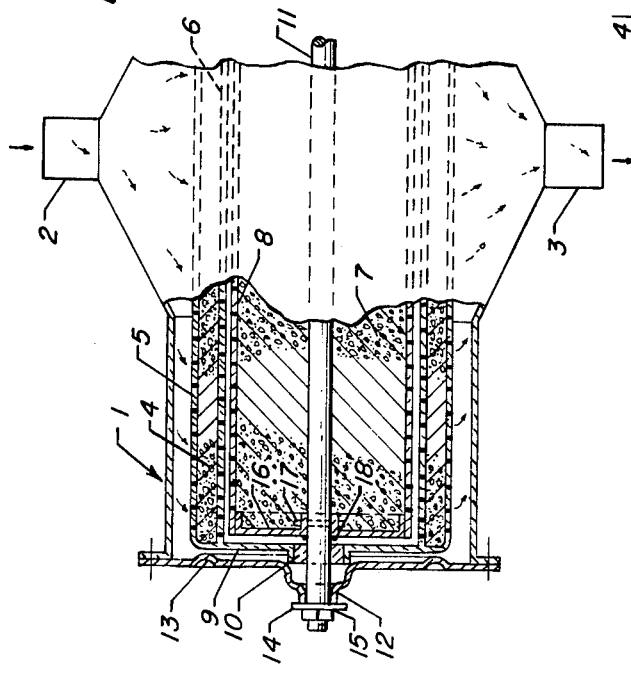

FIG. 4 of the drawing is a partial sectional plan view of the converter system of FIG. 3, as indicated by the line 4—4 in FIG. 3.

Figure 5:
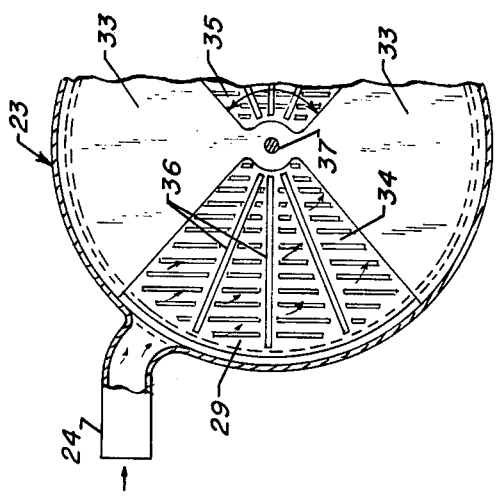

FIG. 5 of the drawing is a partial sectional elevational view indicating the utilization of an impeller wheel and gearing means to be operative from the incoming exhaust gas stream so as to effect the rotational movement of the $SO_2$ adsorptive bed.

Referring now particulary to FIGS. 1 and 2 of the drawing, there is indicated an outer cylinder form of housing 1 having an exhaust gas inlet 2 and a treated exhaust gas outlet at 3 in order to accommodate the passage of an exhaust gas stream such as from an autombile or truck type engine. Also, in the present embodiment, there is an internally positioned rotable annular-form bed of a $SO_2$ adsorptive material 4 maintained between spaced apart cylindrical screens or perforate plate members 5 and 6. The bed 4 thus entirely encompasses a centrally positioned catalyst bed 7 which is retained within a cylindrical screen or perforate plate member 8.

As best shown in FIG. 1, the cylinder-form screens or plates 5 and 6 for the annular bed 4 connect with an end plate 9 which has a bearing portion 10 adapted to rotate around a central shaft 11. The latter is in turn indicated as being supported by a suitable flanged section 12 provided from an end plate 13 for housing 1. There is further indicated the utilization of a washer 14 and nut 15 to hold the shaft member 11 in place with the converter housing 1. The opposing end portion of the converter housing 1 would be similar to that shown in the drawing such that the entire bed of sorptive material 4 within its retaining means would be free to rotate about the inner catalyst bed 7. There is also an indication in FIG. 1 that the retainer for the catalyst bed 7 will include end plate means, such as 16, to be connective to the ends of the cylindrical wall plate 8 such that the catalyst 7 will be entirely retained within a confined central cylinder. There is a further indication that the end plate 16 may be fixed by a pin at 17 to the shaft 11 or tack welded, such as at 18, to preclude the rotational movement of the catalyst within the converter housing.

As best shown in FIG. 2, there is shown the placement of a plurality of spaced apart longitudinal fins or blade members 19 within the annular-form bed 4 and between the clindrical members 5 and 6 such that there are resultng vane type members for impingement from the incoming exhaust gas stream flow by way of inlet port 2. There is the further indication of the utilization of a longitudinal baffle or flow blocking member 20 which extends inwardly from the inside wall of the housing 1 and which will cause the incoming gas stream to be distributed to one side of the annular-form bed 4 and result in the undirectional rotation of the bed about the shaft 11. There is also indicated a generally opposing baffle or flow restricting member 21 which will attach to the inside wall of the housing 1 such that the incoming exhaust gas stream will not be permitted to bypass by flowing direclty to outlet port 3 but will necessarily be channeled into and through the full length of a segmental portion of the annular-form bed of $SO_2$ adsorptive material 4 and thence into the centrally positioned catalyst bed 7.

As heretofore set forth, the bed of $SO_2$ adsorptive material indicated at 4 will be of a gas pervious nature in order to permit continuous flow therethrough; while at the same time, there will be the selective adsorption of the sulfur compounds to preclude their entry into the catalyst section where there would be oxidation to $SO_3$ whereby there could be further conversion to sulfuric acid as the treated gases and water vapor leave the converter system. The catalytic material of bed 7 will also be gas pervious, or will have suitable catalytically coated passageway mean, such that the resulting treated gas stream leaving catalyst 7 will contact that portion of the adsorptive bed 4 which is on the downstream side of the flow restricting means 20 and 21 and then be discharged into plenum section 22 which in turn connects with outlet means 3.

In accordance with the present invention and in accordance with the operation of the present system, the lower temperature incoming gas stream at a level generally below about 1000° F. and generally less than about 800° F., will contact the adsorptive material of bed 4 and will provide for the substantial removal of $SO_2$ content of the stream and preclude it from reaching the catalyst section 7 Subsequently, as the treated stream leaves the catalyst contact in bed 7, there will be an elevated temperature for the stream at perhaps 200°–400° F. so that a major portion of the $SO_2$ which was adsorbed into the material 4 can be desorbed by the stream as it leaves the catalyst and enters that portion of bed 4 which is downstream from the catalyst and from the baffle members 20 and 21 to thus be discharged from the outlet 3 along with the treated gas stream. In other words, a major portion of the $SO_2$ component in the charge stream is effectively by passed around the catalyst 7 by the sorptive material 4.

In the embodiment of FIGS. 3 and 4, there is indicated a circular-form of housing 23, with an inlet means 24 and an outlet means 25. which s designed and arranged to hold a generally disc-like catalyst section 26, as well as a rotatable disc-shaped sorbent bed 27. The incoming exhaust gas stream from inlet 24 will first pass to an upper gas distribuition zone 28 and then flow downwardly through a sectional portion of bed 27 being held between screens or perforate plate means 29 and 30 to thus reach an opposing sectional portion of the catalyst 26. In this instance the catalyst 26 is indicated as being of a honeycomb configuration with a multiplicity of small longitudinal passgeways all of which will be catalytically coated to provide a large catalyst surface area for the conversion of exhaust gas stream. The teated gas from the portion of catalyst honeycomb element 26 will reach a redistribution area 31 in the lower portion of the housing 23 and then reverse direction and flow upwardly through a different portion of the honeycomb 26 as well as through an opposing portion of the sorptive bed 27 in a zone generally diametrically opposite to the incoming gas area from inlet means 24. From bed 27, the treated gas stream, together with desorbed $SO_2$, will reach a collection zone 32 which connects to outlet means 25 so as to provide for the removal of the gases from the system. As best shown in the partial plan view of FIG. 4, there is a plate 33 within the upper portion of the housing 23 which is provided with a segmental opening 34 which permits the controlled passage of the incoming gases through an opposing segmental portion of the sorptive bed 27 and, additionally, there is an opposing segmental opening 35 within the plate 33 which provides for the controlled reverse gas flow through the catalyst section 26 and an opposing portion of the sorptive bed 27. With continuous gas flow and contiuous sorptive bed movement, there can be a continuing desorption of $SO_2$ from the sorptive bed prior to the discharge of the treated gas stream and the $SO_2$ by way of outlet 25.

Also as best shown in FIG. 4 there is an off-center positioning for the inlet port means 24 with respect to the housing 23 as well as for the opening 34 in plate 33 such that the velocity of the incoming gas stream can cause an impingement upon radial vanes or blades 36, which are indicated as attaching to the upper perforate plate member 29 of the retainer means for the sorptive material 27, and such that the resulting vector forces will in turn rotate the entire bed 27. Various means may be used to effect bed movement; however, as shown in FIG. 3, the center portions of the plate retainer means for the bed of material 27 encompass and connect with a pin or shaft means 37 which, in turn, can be mounted to freely rotate within a lower roller bearing means 38 that is supported from transverse bar members 40 and within an upper bearing 39 that is held by the upper portion of housing 23. With the use of a rotatable bed of $SO_2$ sorptive material, there is provided the desired continuous operation where the incoming gas stream can continuously give up a major portion of the $SO_2$-content into a segmental portion of the sorptive bed while at the same time there is a continuous desorption of $SO_2$ from the bed by the treated gas stream which leaves the downstream end of the catalysts section and contacts the sorptive bed in a reverse flow manner through a continuously changing segmental portion thereof.

It will be obvious to those skilled in the art that still other forms of apparatus and converter system embodiments may be provided to have a movable bed of sorptive material effect a bypassing of the $SO_2$ around the catalyst section and that the invention need not be limited to the diagrammatic embodiments of FIG. 1 and FIG. 3. It will also be obvious that various types of bed retaining means with various screens or perforate plate configurations may be utilized to effect the support of both the subdivied sorptive material and the catalyst material in gas pervious arrangements.

It should also be noted that various additional types of blades or vanes may be utilized in combination with the incoming gas flow, or even in combination with an outgoing gas flow, to effect the rotation of the sorptive bed and the invention should not be limited to the particular diagrammatic embodiments heretofore described. For example, in FIG. 5 of the drawing, there is indicated a still further type of bed moving arrangement which utilizes a rotatable impeller wheel and gear means to effect the desired rotation. More specifically, there is indicated a converter housing 41 with an inlet port 42 and an internal arrangement for the catalyst and movable sorptive bed which is similar to the configuration of FIG. 3. In other words, there is a lower catalyst section 43, a lower plenum section 44, a rotatable sorptive bed at 45 between screens or retainer plates 46 and 47 and an upper partitioning plate member 48 which, in turn, will provide for a segmental gas stream inlet opening 49 and an opposing segmental outlet opening 50. The retainer section for sorptive bed 45 is also provided with a central shaft 51 which can rotate in a lower bearing 52 and in an upper bearing 53. However, in the present embodiment, in lieu of radial vanes or blades, there is indicated the use of a rotatable impeller wheel 54 which is in position to have its radially extending blade portions in the path of the incoming exhaust gas stream from inlet 42 such that there will be rotation of a shaft 55 with a spur gear 56. The latter, in turn, meshes with a larger gear member 57 attached to the upper end portion of the shaft 51 so as to effect the desired rotation of the bed 45. Here again, the resulting rotation of the bed 45 will effect the desired movement of the sorptive material between the incoming $SO_2$ sorption area and an opposing desorption area where the higher temperature treated exhaust gas stream can effect the removal of $SO_2$ from the bed and permit its continuous reusage in the converter system.

As heretofore noted, it will be obvious that still other bed moving arrangements may be provided; however it is a principal feature of the invention to make use of the exhaust gas stream flow as it passes through the converter system to provide the motive power for moving the sorptive material between the incoming sorption zone and the desorption zone. Although each of the emodiments illustrated have made use of the incoming velocity from the exhaust gas effect of the movement of a sorptive bed, it is to be pointed out that blade means, impeller means, or whatever vector force arrangement is utilized, the stream impact may be arranged to be in the downstream portion of the converter housing, or even within an intermediate portion thereof, rather than at the inlet area. It may still be further noted that the shaft and bearing arrangements of the present drawing are merely diagrammatic and that various special or conventional types of mounting means may be provided within the scope of the invention.

I claim as my invention:

1. A catalytic converter for purifying engine exhaust gases while preventing sulfur dioxide from contacting a catalyst to preclude the formation of sulfuric acid and which comprises in combination,
   a. a confined housing with exhaust gas inlet means thereto and a purified gas outlet therefrom;
   b. a gas permeable catalyst retaining section fixedly positioned within said housing;
   c. a shaft supported by said housing an additional gas permeable section for retaining a $SO_2$ adsorbent material therein that is rotatably supported upon said shaft within said housing to be maintained adjacent said catalyst section in a manner to permit gas flow between said sections and to provide movement of said adsorbent material between an upstream adsorption zone and downstream desorption zone;

d. gas flow diverter means positioned in said converter to direct the incoming stream through the SO$_2$ adsorption zone and through a portion of said SO$_2$ adsorbent material so as to pass a substantially SO$_2$-free stream to said catalyst section and, in addition, to direct a treated stream from said catalyst section through said downstream description zone to remove SO$_2$ from another portion of the adsorbent material and from the converter, and e. rotatable vane means in interconnection with said rotatable section for rotating said rotatable section, said vane means being positioned within the exhaust gas stream flow path through the housing whereby the adsorbent material in said rotatable section will continuously move therewith between the SO$_2$ adsorption and desorption zones in the housing.

2. The converter as defined in claim 1 wherein said housing is of a cylindrical configuration, the catalyst retaining section is of a cylindrical configuration of the nature of a central core, and said SO$_2$ adsorbent material is held in a retaining section having an annular configuration rotatably encompassing said catalyst retaining section, and wherein said vane means include baffles extending at spaced locations longitudinally within the annular retaining section for the adsorptive material whereby said annular retaining section is rotated when the exhaust gas stream contacts said baffles and said converter further comprising bearing means attached at each end of said shaft thereby providing for the rotational movement of the adsorbent material retaining section around such shaft and around the centrally positioned catalyst section.

3. The converter as defined in claim 1 wherein the catalyst retaining section is of a disc-like configuration within a generally shallow cylindrical form confined housing and the gas permeable section for retaining the SO$_2$ adsorbent material is also of a disc-like configuration positioned adjacent the catalyst retaining section, whereby the gas flow diverter means in said converter will direct the incoming gaseous stream through a segmental portion of the retaining section for the SO$_2$ adsorbent material prior to the stream entering the catalyst section, while a generally diametrically opposing portion of the gas flow diverter means permits flow of the purified gas stream from the catalyst section through an opposing segmental portion of the SO$_2$ adsorbent material retaining section, whereby there is a resulting desorption of SO$_2$ by the purified gas stream prior to discharge of the purified stream from the converter.

4. The converter as defined in claim 3 wherein the exhaust gas inlet means to the housing is positioned in a manner providing a tangential flow for the incoming exhaust gas stream with respect to the retaining section for said SO$_2$ adsorbent material and said vane means comprise a plurality of spaced radially extending vanes whereby said incoming exhaust gas stream contacts said vanes, causes said vanes to rotate and thereby causes said SO$_2$ adsorbent material retaining section to rotate within the converter housing.

* * * * *